United States Patent [19]
Yanamoto et al.

[11] Patent Number: 4,991,044
[45] Date of Patent: Feb. 5, 1991

[54] DISK DRIVE ASSEMBLY WITH AN AUTO-EJECTOR DRIVEN BY THE ASSEMBLY MOTORS

[75] Inventors: Kaoru Yanamoto; Toshiro Ohta, both of Kanagawa; Hideaki Hotta, Tokyo; Akira Kadonaga, Kanagawa, all of Japan

[73] Assignee: Sony Corporation, Tokyo, Japan

[21] Appl. No.: 238,567

[22] Filed: Aug. 30, 1988

[30] Foreign Application Priority Data

Sep. 5, 1987 [JP] Japan ................... 62-222561
Feb. 3, 1988 [JP] Japan ................... 63-023058

[51] Int. Cl.⁵ .................. G11B 17/04; G11B 5/016
[52] U.S. Cl. ........................ 360/99.07; 360/71; 360/99.02; 360/99.06
[58] Field of Search ......... 360/71, 97.01, 99.01–99.03, 360/99.06–99.07

[56] References Cited

U.S. PATENT DOCUMENTS

| | | | |
|---|---|---|---|
| 4,246,618 | 1/1981 | Bauer | 360/99.02 |
| 4,466,033 | 8/1984 | Jordan et al. | 360/99.02 |
| 4,829,393 | 5/1989 | Shimizu et al. | 360/99.07 X |

FOREIGN PATENT DOCUMENTS

| | | |
|---|---|---|
| 0039975A2 | 11/1981 | European Pat. Off. . |
| 0120124A1 | 10/1984 | European Pat. Off. . |
| 0273510A2 | 7/1988 | European Pat. Off. . |
| 60-63761 | 4/1985 | Japan ........................ 360/99.07 |
| 61-208666 | 9/1986 | Japan . |
| 61-208667 | 9/1986 | Japan ........................ 360/99.06 |

*Primary Examiner*—John H. Wolff
*Attorney, Agent, or Firm*—Philip M. Shaw, Jr.

[57] ABSTRACT

An auto-ejector incorporated in a disk recording and/or reproducing apparatus is driven by a disk driving motor and a head driving motor which are requisite for the apparatus. That is, the ejector is triggered under the power of the head driving motor, and a disk cartridge in which a disk is accommodated is ejected under the power of the disk driving motor. Thus, any device, such as an electromagnetic device, a motor or the like used only for the ejector is not needed.

4 Claims, 5 Drawing Sheets

4,991,044

DISK DRIVE ASSEMBLY WITH AN AUTO-EJECTOR DRIVEN BY THE ASSEMBLY MOTORS

BACKGROUND OF THE INVENTION

1. Field of the Invention

This invention relates to an auto-ejector of recording mediums incorporated in an apparatus for recording on and/or reproducing from the disk-like recording mediums, such as floppy disks or the like.

2. Description of the Prior Art

One prior art auto-ejector is of the type which is connected with a disk driving motor of the apparatus by a mechanism including a solenoid and the like when an ejection start signal is detected, so that a recording medium is ejected under the power of the disk driving motor. The solenoid and the like can be substituted by a motor.

In the above auto-ejector, a solenoid or the like, or a motor used only for driving the ejection mechanism is necessary, even though the disk driving motor of the apparatus is used also as a motor for ejecting the recording medium. Therefore, it is difficult to reduce the size and weight of the apparatus, and to lower the production cost of the apparatus.

OBJECTS AND SUMMARY OF THE INVENTION

Accordingly, it is an object of the present invention to provide an auto-ejector which avoids the previously described disadvantages of the prior art.

More specifically, it is an object of this invention to provide an auto-ejector in which disk-like recording mediums are ejected only using both the head driving motor and the disk driving motor, which are requisite for the ordinary disk recording and/or reproducing apparatus, so that it is unnecessary to provide electromagnetic devices, motors or the like used only for the auto-ejector. Thus, it is easy to reduce the size and weight of the apparatus, and to lower the production cost of the apparatus.

A further object of the invention is to provide an auto-ejector which is forcibly disconnected from the disk driving motor at the time the ejection is finished under the power of the head driving motor. Therefore, a change-over between an operation mode and a stop mode can be always surely effected, and reliability of the apparatus is considered increased.

In accordance with an aspect of this invention, in an auto-ejector for ejecting a disk-like recording medium from a disk recording and/or reproducing apparatus, which has a disk driving motor for driving a turntable on which the disk-like recording medium is mounted; a head driving motor for driving a carrier, whereby record/playback heads are carried substantially in the radius direction of the disk-like recording medium mounted on the turntable; and ejection means for ejecting the disk-like recording medium from the apparatus, the auto-ejector comprises control means for making the head driving motor start at an ejection start signal to displace the heads beyond a record/playback range thereof; trigger means put in action by the carrier when the heads are displaced beyond the record/playback range thereof; and transmission means for transmitting the power of the disk driving motor to the ejection means by the action of the trigger means, so as to eject the disk-like recording medium from the apparatus.

The above, and other objects, features and advantages of this invention, will be apparent in the following detailed description of an illustrative embodiment thereof which is to be read in connection with the accompanying drawings wherein like reference numerals identify the corresponding parts in the several views.

DETAILED DESCRIPTION OF A PREFERRED EMBODIMENT

Figure 1:
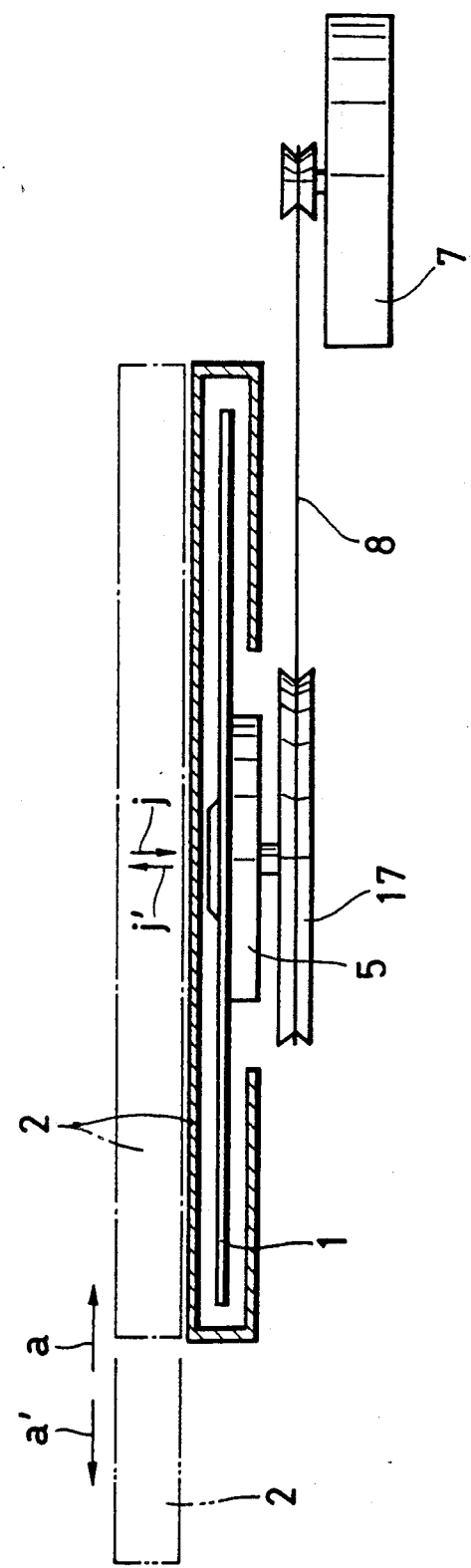
FIG. 1 is a schematic vertical sectional view of a disk-driving means of a disk cartridge and a disk recording and/or reproducing apparatus having an auto-ejector, illustrating the disk cartridge mounted on and ejected from the disk driving means.
Figure 2:
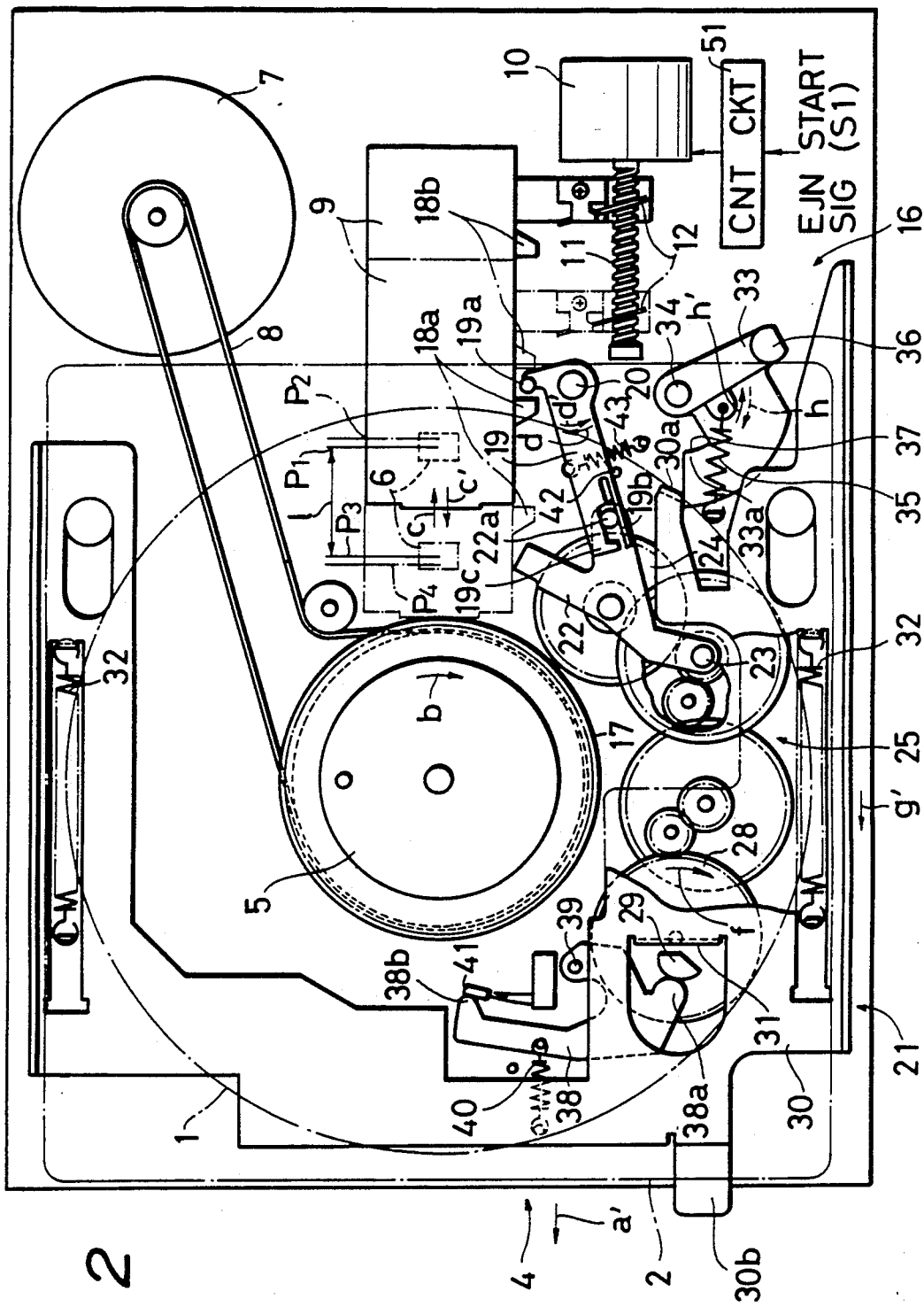
FIG. 2 is a top plan view of a disk driving apparatus of the type schematically depicted in FIG. 1 and incorporating an auto-ejector apparatus according to the invention, showing the system components and their respective positions in response to a begin ejection command signal.

Referring to the drawings in detail, and initially to FIGS. 1 and 2 thereof, it will be seen that the auto-ejector 16 to be described may be incorporated in a disk recording and/or reproducing apparatus 4.

A disk cartridge 2 indicated in chain-dotted lines in FIG. 2, in which a disk-like recording medium 1, such as a floppy disk is rotatably accommodated, is horizontally pushed into the apparatus 4 from the left side in FIG. 2 as indicated by arrow a in FIG. 1. When the disk-like recording medium (hereinafter described only as a disk) 1 is positioned over a turntable 5, the disk 1 is vertically lowered in the direction of arrow j by a disk loading mechanism (not shown) so as to horizontally mount the disk 1 on the turntable 5 as indicated in solid lines in FIG. 1. Thereafter, a pair of upper and lower record/playback heads 6 are inserted into the disk cartridge 2 from above and below so as to be brought into contact with the upper and lower faces of the disk 1, respectively.

Then, a disk driving motor 7 is started, and by the turntable 5 driven by the motor 7 through a timing belt 8, the disk 1 is rotated in the direction of arrow b within the cartridge 2. Almost at the same time, the heads 6 mounted on a carrier 9, are moved within predetermined range as shown in FIG. 2 in the direction of the arrows c or c', that is, almost in the radius direction of the disk 1 by a head driving motor 10. Thus, selective recording on, or selective reproducing from the disk 1 is performed.

Incidentally, shown in FIG. 2 is a head driving means of the type that the carrier 9 is moved in the direction of arrows c and c' through a needle 12, one end of which is fixed to the carrier 9, and the other end of which is fitted in the thread groove of a lead screw 11 driven by the head driving motor 10.

The auto-ejector 16 for ejecting the disk 1 in the direction of the arrow a' in FIG. 1 works under the powers of the disk driving motor 7 and the head driving motor 10, which are started at an ejection start signal S1 As shown in FIG. 2, the disk driving motor 7 drives a gear 17 in the direction of arrow b, the gear 17 being formed integrally with the turntable 5 at the lower end thereof, and the head driving motor 10 started at the ejection start signal S1 through a control circuit 51 puts a trigger means 19 in action.

Figure 3:
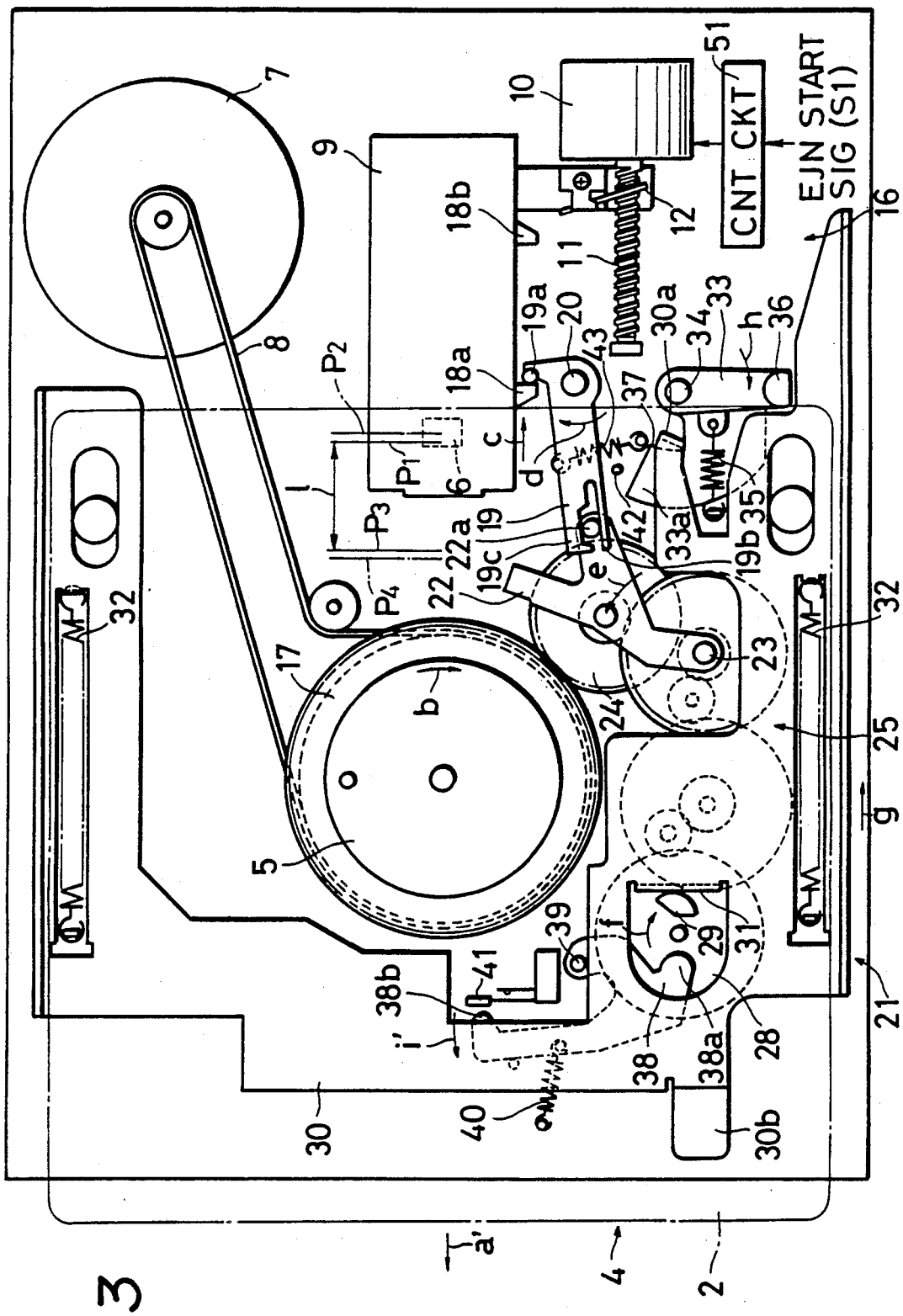
FIG. 3 is a top plan view of the apparatus, similar to FIG. 2, showing the movement and position of the components.

That is, the head driving motor 10 moves the carrier 9 from the position shown in FIG. 2 to the position shown in FIG. 3, so as to displace the heads 6 located within the range l to a position $P_2$, the utmost limit of the disk 1 that is about 1 to 3 mm apart from a position $P_1$, an outer reference position (00 track), so that an engagement portion 18a projecting from the carrier 9 pushes a pin 19a provided at one end of the lever 19, which is made of synthetic resin.

Then, the lever 19 is swung on a fulcrum 20 in a direction of arrow d as shown in FIG. 3, and an elastic arm 19b formed integrally with the lever 19 at the other end thereof pushes a pin 22a provided at one end of a lever 22, which is made of synthetic resin, so that the lever 22 is swung on the fulcrum 23 in a direction of the arrow e. This causes a gear 24 mounted on the lever 22 meshes with the gear 17.

As a result, the rotation of the gear 17 driven by the disk driving motor 7 in the direction of arrow b is transmitted through the gear 24 and a train of gears 25 to a gear 28, which is made of synthetic resin and on which a cam 29 is integrally provided, so that the gear 28 is rotated in the direction of arrow f from the stopped position thereof shown in FIG. 2.

This causes the cam 29 to abut against a cam follower 31 provided in a slide plate 30 as shown in FIG. 3, and the slide plate 30 is moved in the direction of the arrow g against the force of tension coiled springs 32 from its rearward position shown in FIG. 2 to its forward position shown in FIG. 3. Due to the movement of the slide plate 30, the disk cartridge 2 is vertically raised in the direction of arrow j' to a position indicated in chain-dotted lines in FIG. 1 by the disk loading mechanism to make the disk 1 separate from the turntable 5.

Just before the slide plate 30 reaches the forward position, a locked portion 33a provided as a part of a lever 33 and made of synthetic resin is disengaged from a locking portion 30a of the slide plate 30, so that the lever 33 is swung on a fulcrum 34 by a tension coiled spring 35 in the direction of the arrow h from the position shown in FIG. 2 to the position shown in FIG. 3. Thus, the disk cartridge 2 is pushed in the direction of the arrow a' and ejected to a position indicated in double dots and dash lines in FIG. 1 by an ejection pin 36 formed integrally with the lever 33.

Figure 4:
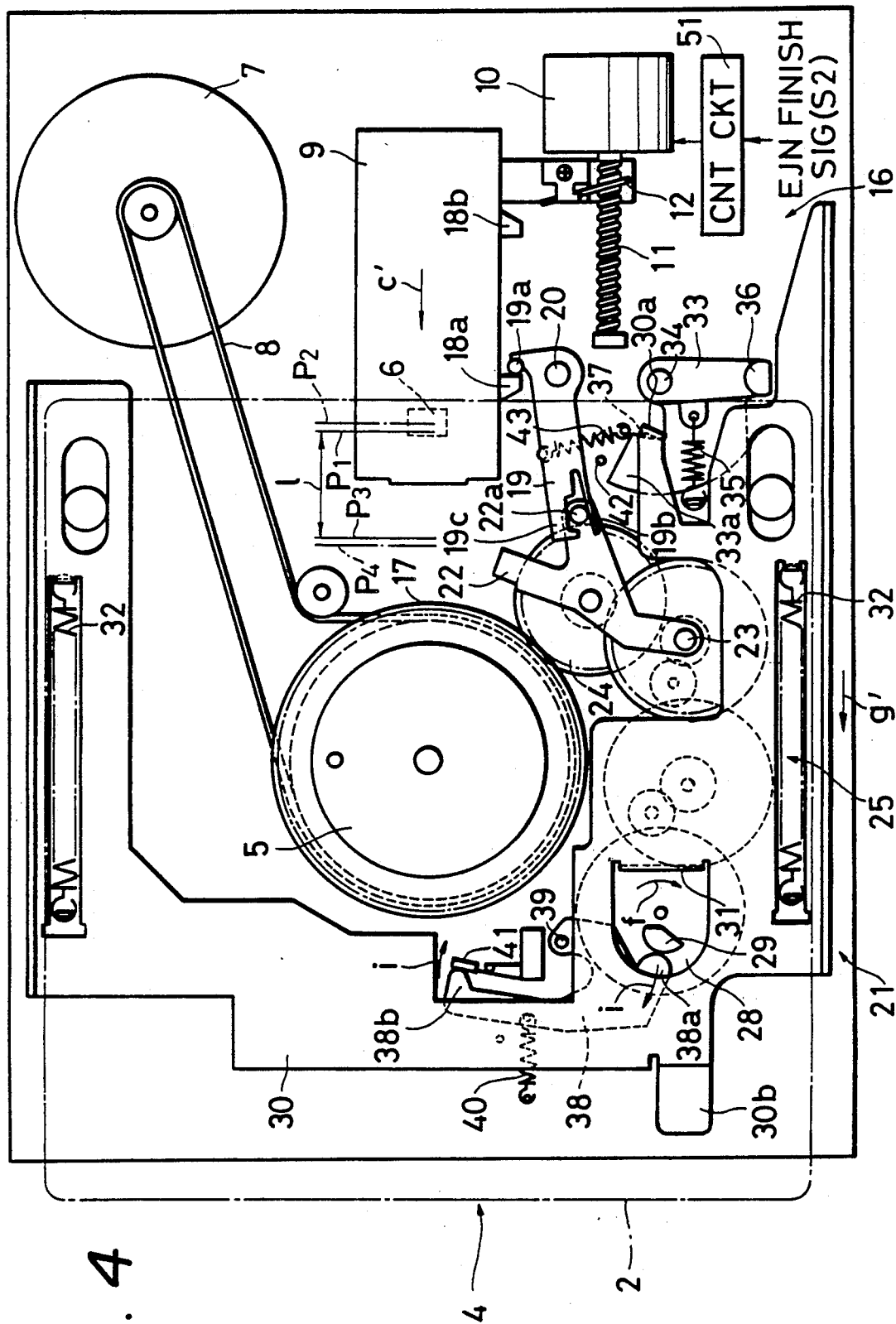
FIG. 4 is a top plan view of the apparatus, similar to FIG. 3, showing further movement and position of the components in response to the system having received the begin ejection command signal and when the system receives a terminate ejection command signal thereafter.

Next, when the locking portion 30a of the slide plate 30 enters into a recess 37 in the locked portion 33a of the lever 33 as shown in FIG. 3, and the slide plate 30 is returned a little from its forward position by the force of the springs 32, the locking portion 30a of the slide plate 30 is engaged with the base of the locked portion 33a of the lever 33, so that the lever 33 is locked again as shown in FIG. 4.

Thereafter, when the gear 28 makes almost one revolution in the direction of arrow f as shown in FIG. 4, one end 38a of a switch lever 38 is pushed by the cam 29, so that the switch lever 38 is swung on a fulcrum 39 in a direction of arrow i against the force of a tension coiled spring 40. Thus, a detecting switch 41 is pushed by the other end 38b of the switch lever 38 to close the switch 41.

Figure 5:
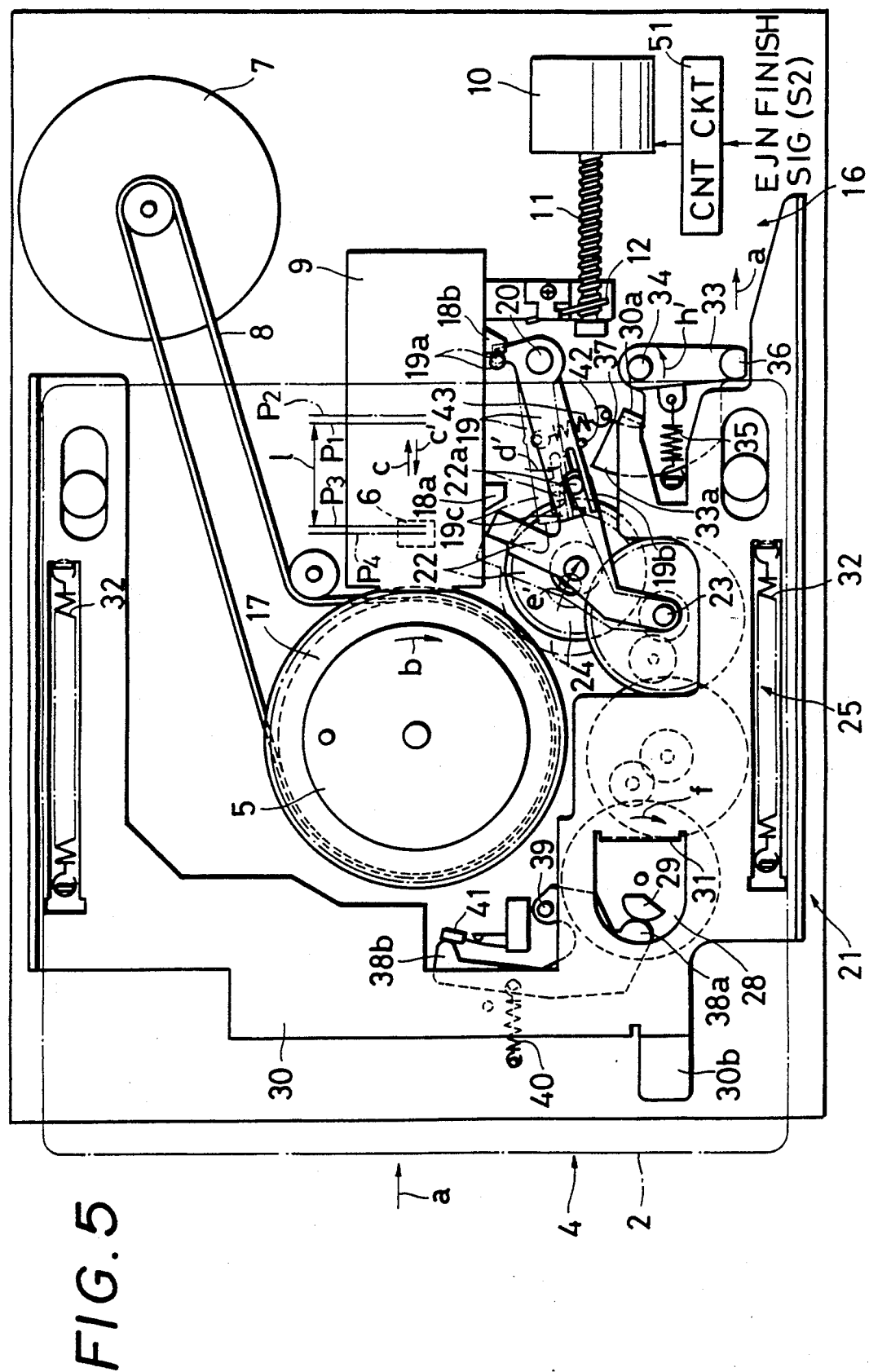
FIG. 5 is a top plan view of the apparatus, similar to FIG. 4, showing further movement of the components in response to the system receiving the terminate ejection command signal.

As soon as the switch 41 is closed as shown in FIG. 4, the disk driving motor 7 is stopped at an ejection finish signal S2 to stop rotation of the gear 17, and the head driving motor 10 is driven at high speed at the occurence of the ejection finish signal S2 through the control circuit 51 in the reverse direction thereof to move the carrier 9 in the direction of arrow c', so that both of the heads 6 are moved by the carrier 9 as shown in FIG. 5 over range l from the position $P_2$, the outermost limit of the disk 1 to a position $P_4$, the innermost limit of the disk 1, which is spaced apart about 1 to 3 mm from the position $P_3$, the inner reference position (for example, 79th track).

When the heads 6 are moved to the position $P_4$, the other engagement portion 18b projecting from the carrier 9 pushes the pin 19a of the lever 19 in the direction of arrow c'. The lever 19 is swung on the fulcrum 20 in a direction of arrow d', and a nonelastic arm 19c provided at the other end of the lever 19 pushes the pin 22a of the lever 22, so that the lever 22 is swung n the fulcrum 23 in the direction of arrow e'. Thus, the gear 24 is forcibly disengaged from the gear 17.

After the above auto-ejecting processes are completed, the carrier 9 is moved again in the direction of arrow c by the head driving motor 10 so as to move the heads 6 from the position $P_4$ to the position $P_3$ or $P_1$, and then, the head driving motor 10 is stopped.

In the embodiment, so as to shorten the auto-ejecting time and rotate the gear 17 at high speed in the direction of arrow b, the disk driving motor 7 is disconnected from the servomechanism (not shown) as soon as the ejection finish signal S2 is detected.

Further, in the embodiment, the gear 24 is forcibly disengaged from the gear 17 by the help of the head driving motor 7, so that there is no necessity to provide means for pulling the lever 19 with a return spring. Therefore, a tension coiled spring 43 shown in FIG. 2 is prepared only to properly position the lever 19. That is, the spring 43 has a low spring constant necessary for causing the lever 19 to contact the stop 42 and therefore the spring 43 scarcely hinders the lever 19 from rotating in the direction of arrow d at the time when the engagement portion 18a of the carrier 9 pushes the pin 19a of the lever 19.

Furthermore, in the embodiment, when the ejecting processes start, the lever 19 is swung in the direction of arrow d as shown in FIG. 3 due to displacement of the heads 6 to the position $P_2$, and when the ejecting process finishes, the lever 19 is swung in the direction of arrow d' as shown in FIG. 5 due to displacement of the heads 6 to the position $P_4$. However, the lever 19 may be swung in the direction of arrow d when the carrier 9 is moved in the direction of arrow c', and the lever 19 may be swung in the direction of arrow d' when the carrier 9 is moved in the direction of arrow c.

When the disk cartridge 2 is loaded in the apparatus 4 as initially described, the disk cartridge 2 being inserted into the disk loading mechanism in the direction of arrow a in FIG. 5, pushes the ejection pin 36 with one end thereof, so that the lever 33 is swung in a direction of arrow h' from the position shown in FIG. 5 to the position shown in FIG. 2 against the force of the spring 35. Thus, the side plate 30 is disengaged from the lever 33 and moved in a direction of arrow g' from the forward position shown in FIG. 5 to the backward position shown in FIG. 2 by the force of the springs 32. Then, the disk cartridge 2 is vertically lowered, and the locked portion 33a of the lever 33 abuts against the side of the locking portion 30a of the slide plate 30 to lock the lever 33 again. In FIG. 2, the reference numeral 30b designates a push button for hand operated ejection.

Having described an illustrative embodiment of this invention with reference to the accompanying drawings, it is to be understood that the invention is not limited to that precise embodiment, and that various changes and modifications may be effected therein by one skilled in the art without departing from the scope or spirit of the invention as defined in the appended claims.

According to the auto-ejector of this invention, disk-like recording mediums are ejected by the help of both of a head driving motor and a disk driving motor which are requisite for the disk recording and/or reproducing apparatus, so that it is unnecessary to provide electromagnetic devices, motors or the like used only for the auto-ejector. Thus, it is easy to reduce the size and weight of the apparatus, and to lower the production cost of the apparatus.

Furthermore, the auto-ejector of this invention is forcibly disconnected from the disk driving motor at the end of ejection under the power of the head driving motor. Therefore, the change-over between the operation mode and the stop mode can be always surely effected, and reliability on the apparatus increases very much.

What is claimed is:

1. An auto-ejector for ejecting a disk-like recording medium from a disk recording and/or reproducing apparatus, which has a disk driving motor for driving a turntable on which the disk-like recording medium is mounted; a head driving motor for driving a carrier, whereby record/playback heads are carried substantially in the radius direction of the disk-like recording medium mounted on the turntable; and ejection means for ejecting the disk-like recording medium from the apparatus, the auto-ejector comprising:
control means for controlling the head driving motor and causing it to start at an ejection signal to displace the heads beyond a record/playback range thereof;
transmission means for selectively transmitting the power of the disk driving motor to the ejection means to eject the disk-like recording medium from the apparatus; and
trigger means operatively connected to control the transmission means and actuated by the carrier when the heads are displaced beyond the record/playback range thereof to thereafter cause the transmission means to transmit the power of the disk driving motor to the ejection means.

2. The auto-ejector according to claim 1, further comprising a driving gear driven by the disk driving motor and wherein the transmission means has a driven gear, and when the trigger means is actuated, it causes the driven gear to be engaged with the disk driving motor driving gear to transmit the power of the disk driving motor to the ejection means.

3. An auto-ejector for ejecting a disk-like recording medium from a disk recording and/or reproducing apparatus, which has a disk driving motor for driving a turntable on which the disk-like recording medium is mounted; a head driving motor for driving a carrier, whereby record/playback heads are carried substantially in the radius direction of the disk-like recording medium mounted on the turntable; and ejection means for ejecting the disk-like recording medium from the apparatus, the auto-ejector comprising:
control means for making the head driving motor start in response to an ejection start signal to displace head carrier to a first predetermined position at the outermost limit of the disk-like recording medium, and for making the head driving motor start in response to an ejection finish signal to displace the head carrier from the first predetermined position to a second predetermined position at the innermost limit of the disk-like recording medium and thereafter return the head carrier to the first predetermined position;
transmission means for selectively connecting to the disk driving motor to transmit the power of the disk driving motor to the ejection means to eject the disk-like recording medium;
trigger means operatively connected to the transmission means and actuated by the positioning of the carrier at the first predetermined position to cause the transmission means to connect to the disk driving motor to transmit the power of the disk driving motor to the ejection means so as to eject the disk-like recording medium and, when the carrier is positioned at the second predetermined position, to cause the transmission means to forcibly disconnect from the disk driving motor so as to put the ejection means out of action.

4. The auto-ejector according to claim 3, wherein the trigger means and the transmission means comprise a lever and a gear train, respectively, and when the carrier is displaced to the first predetermined position, the lever is swung in a normal direction to transmit the power of the disk driving motor to the ejection means, and when the carrier is displaced to the second predetermined position, the lever is swung in the reverse direction to disconnect the disk driving motor from the transmission means.

* * * * *